United States Patent Office 3,219,694
Patented Nov. 23, 1965

3,219,694
ALPHA-THIOCARBAMOYL-2,6-DICHLORO-BENZALDOXIME
John Yates, Whitstable, Kent, and Sidney Edward Callander, Sittingbourne, Kent, England, assignors to Shell Oil Company, New York, N.Y., a corporation of Delaware
No Drawing. Filed Nov. 23, 1962, Ser. No. 239,792
Claims priority, application Great Britain, Nov. 27, 1961, 42,312/61
1 Claim. (Cl. 260—551)

This invention relates to novel alpha-substituted benzaldoximes and to a process for their preparation. The invention also relates to the method of use of said compounds as pesticides, particularly to control microorganisms such as fungi and bacteria, and to control growth of unwanted plants, and to compositions containing said compounds.

The novel compounds of the invention are alpha-substituted benzaldoximes of the general formula

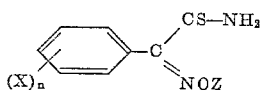

(I)

and salts thereof, wherein
X represents a halogen atom;
n is the integer 1, 2, 3, 4 or 5;
Z represents a hydrogen atom, and acyl group or an alkoxycarbonyl group.

The alpha-substituted benzaldoximes of the above general formula can exist as syn- or anti-isomers or as mixtures thereof and the present invention relates to any or all of these forms.

In the above formula, the halogen in each case is preferably chlorine or bromine, but fluorine and iodine are also possible as nuclear substituents. Where two or more halogen atoms are present in the molecules, the atoms may be of the same or different halogens. In general, in the compounds of this invention, herbicidal activity is associated with halogen substituted on at least one of the carbon atoms of the phenyl ring ortho in position to the carbon atom to which is bonded the aldoxime moiety, with the compounds in which halogen is bonded to both of the ortho carbon atoms (i.e., the 2,6-dihalophenyl subgenus of the group) being most active. Compounds of the invention most active toward microorganisms appear to be those in which a halogen atom is bonded to the carbon atom in the para (4-) position relative to the carbon atom of the phenyl ring to which is bonded the aldoxime moiety.

Compounds of the invention in which Z represents the group =NOH, may be in the form of the free acid or of a salt. The salt forming cation may be that of an alkali metal or one equivalent of an alkaline earth metal (sodium, potassium or calcium salt being preferred); an ammonium or substituted ammonium salt, for example, a triethylammonium or an alkanolammonium, especially a triethanolammonium salt.

In compounds of the above general formula in which Z represents an acyl group, the acyl group may, for example, be the radical of an aliphatic or aromatic carboxylic, sulphonic, phosphoric or phosphonic acid. The acyl group may be unsubstituted or may be substituted by halogen preferably chlorine. Preferably, the acyl group is the radical of an aliphatic or chlorinated aliphatic carboxylic acid of 1 to 4 carbon atoms, for example, an acetyl or mono-, di- or trichloro-acetyl group. Where Z represents an alkoxycarbonyl group, it suitably contains 2 to 4 carbon atoms.

The novel compounds of the invention may be prepared by additional reaction of hydrogen sulphide to the corresponding alpha-cyanobenzaldoximes of formula

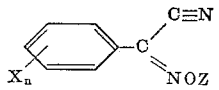

The hydrogen sulphide may be used as such or may be formed in situ from a suitable compound, for example, thionoacetamide ($CH_3 \cdot CS \cdot NH_2$). The reaction is suitably effected by heating the reactants together in a solvent. Dimethylformamide is a particularly suitable solvent for this purpose. Aliphatic ketones such as acetone, methylethylketone or methyl isobutyl ketone, aromatic hydrocarbons such as benzene or a xylene may also be used. Reaction temperatures in the range 90° to 100° C. are in general suitable when dimethylformamide is used as solvent.

The suitable alpha-cyanobenzaldoximes can be prepared by reacting the corresponding benzyl cyanides with nitrous acid. The suitable benzyl cyanides can be prepared by reacting the corresponding alph-halobenzaldoximes with alkali metal (preferably sodium) cyanides. The reactions are preferably carried out in alcoholic solvents, such as methanol or ethanol. The suitable alpha-halobenzaldoximes can be prepared by introducing a dry halogen into a solution of the corresponding nuclearly substituted aldoxime in an inert solvent, for example, chloroform or carbon tetrachloride. It is advantageous to carry out the halogenation in the presence of a neutralizing agent, for example precipitated calcium, barium or magnesium carbonates, to suppress undesirable side reactions. In many cases, the suitable nuclearly substituted aldoximes are known compounds. In any case, they can be prepared by reacting the suitable nuclearly substituted benzal and/or benzyl halides with hydroxylamine, for example, according to the method described in copending application Serial No. 155,845, filed November 29, 1961, and now Pat. No. 3,129,260.

Compounds in which Z represents an acyl group can be prepared reacting the alpha-unsubstituted aldoxime with an acylating agent such as an acid anhydride or acid chloride or ester of a volatile alcohol according to methods well-known in the art. Since acid chlorides such as acetyl chloride are powerful dehydrating agents, however, it is necessary to work under very mild conditions when using these reagents to avoid converting the oxime to the nitrile. Mild reaction conditions should also be employed when acid anhydrides such as acetic anhydride are used.

Compounds in which Z represents an alkoxycarbonyl group can be prepared by reacting an alkyl chloroformate with the alpha-unsubstituted aldoxime in presence of a hydrogen chloride acceptor, for example, a tertiary base, or with a salt, preferably an alkali metal salt of the oxime.

Salts of benzaldoximes of general Formula I wherein Z is hydrogen may be prepared by reacting the oxime with the appropriate base preferably in a suitable solvent.

The following examples illustrate the preparation of the novel compounds of the invention. In these examples parts by weight (w.) bear the same relationship to parts by volume (v.) as does the kilogram to the liter.

*Example 1.—Preparation of alpha-2,6-trichloro-benzaldoxime*

Into a suspension of 2,6-dichlorobenzaldoxime (19 w.) in carbon tetrachloride (200 v.), was passed chlorine until nearly all the oxime had gone into solution, the temperature of the reaction mixture being kept below 15° C. The green solution obtained was evacuated to remove excess chlorine, the solvent and a volatile substance causing a blue odor, presumably nitrosyl chloride. The residue (21.2 w.) partly crystallized on standing. The residue was dissolved in 100 v. of hot 60°/80° C. light petroleum. On cooling colorless leaflets (10 w.), M.P. 89° to 94° C. were obtained. These were filtered off and recrystallized from 60°/80° C. petroleum ether and then had M.P. 93.5° to 94.5° C.

*Analysis.*—Found: C, 37.1%; H, 1.9%. $C_7H_4ONCl_3$ requires: C, 37.4%; H, 1.8%.

*Example II.—Preparation of alpha-cyano-2,6-dichlorobenzaldoxime*

To a stirred solution of alpha-2,6-trichlorobenzaldoxime (6.7 w.) in ethanol (50 v.) was added gradually a solution of sodium cyanide (2.5 w.) in water (10 v.) during which the temperature of the mixture rose to about 45° C. The mixture was heated at 50° to 60° C. for 30 minutes, then cooled and filtered. The filtrate was evaporated to dryness, the residue dissolved in water, the solution acidified with 3 N hydrochloric acid and extracted twice with methylene dichloride (20 v. each time). The combined extracts were dried with calcium chloride and evaporated to dryness. The residue was recrystallized from carbon tetrachloride. Yield 3.8 w.; M.P. 118° to 120° C.

*Analysis.*—Found: C, 44.6%; H, 1.8%; Cl, 33.9%. $C_8H_4ON_2Cl_2$ requires: C, 43.8%; H, 1.9%; Cl, 33.0%.

*Example III.—Preparation of alpha-thiocarbamoyl-2,6-dichlorobenzaldoxime*

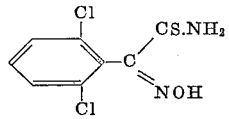

Alpha-cyano-2,6-dichlorobenzaldoxime (12.0 w.) and thionoacetamide (8.4 w.) were heated together in dimethylformamide (50 v.) containing hydrogen chloride (18 w.) for two hours on a steam bath. The resulting solution was poured into water and sodium bicarbonate added until the mixture reacted only slightly acid to wide range indicator paper. The mixture was extracted with ether, the ethereal extract washed with water, dried over anhydrous sodium sulphate and the ether removed from the dried extract. The crude product thus obtained (11.8 w.) was triturated with hexane and finally recrystallized from a mixture of benzene and hexane. The recrystallized product (5.0 w.; 50% yield) had melting point 105° C. to 115° C.

*Analysis.*—Found: C, 38.5%; H, 2.8%; N, 11.2%; S, 13.1%. $C_8H_6Cl_2N_2OS$ requires: C, 38.8%; H, 2.4%; N, 11.2%; S, 12.9%.

*Example IV.—Preparation of alpha-thiocarbamoyl-4-chlorobenzaldoxime*

4-chloro-alpha-cyanobenzaldoxime (16.5 w.) was heated with hydrogen chloride (37.0 w.) and thionoacetamide (13.0 w.) in dimethylformamide (75 v.) for 1 hour. The cooled solution was poured into water, neutralized with sodium bicarbonate and the mixture extracted with ether giving 16 w. of crude material. This was extracted with cold benzene leaving a residue (6.8 w.) of the desired product M.P. 175° to 178°, decomp. Recrystallization from ethanol gave 4.5 w. of purified product, M.P. 181°, decomp.

*Analysis.*—Found: C, 44.6%; H, 3.6%; N, 13.3%; Cl, 16.4%; S, 15.1%. $C_8H_7ON_2ClS$ requires: C, 44.8%; H, 3.3%; N, 13.1%; Cl, 16.5%; S, 14.9%.

Herbicidal activity is exhibited by compounds of general Formula I which are substituted in the ortho position of the phenyl ring by halogen, preferably chlorine or bromine. The results of herbicidal tests carried out with one of the active compounds of the invention are summarized in the following table. These tests were carried out as follows:

Aqueous compositions containing acetone (40 v.), water (60 v.), Triton X–155 (0.5% w./v.) and the benzaldoxime derivative in logarithmically varying concentrations were used. In soil spray and soil drench tests, imbibed seeds of oats (O) and mustard (M), and seedling plants of oats, mustard and linseed (O, M, L) respectively, in sterile No. 1 John Innes compost, were sprayed at 50 gallons per acre or drenched at 1000 gallons per acre. In the foliage test, similar plants of oats, mustard and linseed were sprayed with a volume equivalent to 50 gallons per acre. Control tests in which seeds or plants were sprayed and/or drenched with the aqueous acetone-Triton X–155 solution only were also carried out. The phytotoxic effect of the benzaldoxime applied was assessed by determining the reduction from the control in fresh weight of stem and leaf of the test plants and a regression curve relating growth inhibition and dosage plotted. The dosage of the benzaldoxime derivative required for 50% (G.I.D. 50) inhibition of foliage growth is given in the table. Dosages greater than 10 pounds per acre are indicated by X. It can be seen from the table that the benzaldoxime is much more toxic to grasses than to other plants and that it is most effective against the seeds and roots of grasses.

| WL No. | Structure | 50% Growth Inhibition Dose, lb./acre ||||||||||||||||||
|---|---|---|---|---|---|---|---|---|---|---|---|---|---|---|---|---|---|---|
| | | Seeds—Pre-emergence |||||| Plants—Post-emergence ||||||||||||
| | | Soil Spray |||||| Foliar spray |||||| Soil drench ||||||
| | | O | R.G. | S.C. | P | L | M | O | R.G. | S.C. | P | L | M | O | R.G. | S.C. | P | L | M |
| Alpha-thiocarbamoyl-2,6-dichlorobenzaldoxime | | 2.7 | 1.7 | X | X | 7.5 | 10.0 | X | X | X | X | X | 5.4 | 2.7 | 1.7 | X | X | X | X |

Abbreviations: O=oats, R.G.=rye grass, S.C.=sweet corn, P=peas, L=linseed, M=mustard, X=G.I.D. 50 greater than 10 lb./acre.

Another compound of the invention—that of Example IV—is nearly innocuous with respect to plants, but is an effective microbiocide, as is demonstrated by the following tests and their results:

(1) 100% inhibition of germination of spores of *Alternaria brassicicola* was obtained when wallflower leaves were dipped in an aqueous dispersion containing 10% by volume of acetone, 50 parts per million (by weight) of Triton X–100 and 625 parts per million (by weight) of α-thiocarbamoyl-4-chlorobenzaldoxime (the lowest concentration tested), surface dried, sprayed with an aqueous suspension of the spores and then incubated for 24 hours at 24° C. and relative air humidity of over 90 percent.

(2) α-Thiocarbamoyl-4-chlorobenzaldoxime had, at a concentration of 100 parts per million, a bacteriostatic effect on *Bacillus subtilis* and *Pseudomonas putrefaciens* in peptone broth.

This invention relates further to compositions comprising an alpha-substituted benzaldoxime as hereinbefore specified and a carrier or a surface active agent or a carrier and a surface active agent.

The term "carrier" as used herein means a material, which may be inorganic or organic and synthetic or of natural origin, with which the active substance is mixed or formulated to facilitate its storage, transport and handling and its application to the plant, seed, soil or other object to be treated. The carrier is preferably biologically and chemically inert. It may be a solid or a fluid. Solid carriers are preferably particulate, granular or pelleted though other shapes and sizes are not thereby excluded. Solid carriers, generally obtainable in particulate, granular or pelleted form, may be naturally occurring minerals, though they may have been subjected to grinding, sieving, purification and other treatments, for example gypsum, tripolite, diatomite, mineral silicates such as mica, vermiculite, talc and pyrophylite and clays of the montmorillonite, kaolinite or attapulgite groups, calcium or magnesium limes or calcite and dolomite. Carriers produced synthetically, for example, synthetic hydrated silicon oxides and synthetic calcium silicates may also be used and many proprietary products of this type are available commercially. The carrier may also be an elemental substance such as sulphur or carbon, preferably an activated carbon. If the carrier possesses intrinsic catalytic acidity such that it would decompose the toxicant it is advantageous to incorporate a stabilizing agent, for example, urea or hexamethylene tetramine, to neutralize this acidity and so prevent possible decomposition of the benzaldoxime.

For some purposes, a resinous or waxy carrier may be used, preferably one which is solvent soluble or thermoplastic, including fusible. Examples of such carriers are natural or synthetic resins such as a coumarone resin, copal, shellac, dammar, polyvinyl chloride, styrene, polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax. Compositions comprising such resinous or waxy carriers are preferably in granular or pelleted form.

Fluid carriers may be liquids, for example, water or an organic fluid including a liquefied normally vaporous or gaseous material, or a vaporous or gaseous material, and may be solvents or non-solvents for the active material. Horticultural petroleum spray oils boiling in the range 275° to 575° F. or boiling in the range 575° to 1000° F. and having an unsulphonatable residue of at least 75% and preferably of at least 90%, or a mixture of these two types of oil are particularly suitable liquid carriers.

The carrier may also be a simple or compound fertilizer which may be a solid, preferably granular or pelleted, or a liquid, for example an aqueous solution.

The carrier may be mixed or formulated with the active material during its manufacture or at any stage subsequently. The carrier may be mixed or formulated with the active material in any proportion. One or more carriers may be used.

The compositions of the invention may be concentrates, suitable for storage or transport and containing, for example, from 10 to 95% by weight of the substituted benzaldoxime. These can be diluted with the same or a different carrier to a concentration suitable for application. The compositions of the invention may also be dilute compositions suitable for application. In general, concentrations of 0.01 to 0.5% by weight, of active material based on the total weight of the composition are satisfactory, though lower and higher concentrations can be applied if necessary. Effective weed control is obtainable by applying the compositions at the rate of 1 to 20 pounds per acre of a herbicidally active benzaldoxime.

The compositions of the invention may be formulated as dusts. These comprise an intimate mixture of the benzaldoxime and a finely powdered solid carrier such as is indicated above. These powder carriers may be oil-treated to improve adhesion to the surface to which they are applied. These dusts may be concentrates, in which case a highly sorptive carrier is preferably used. These require to be diluted with the same or a different finely powdered carrier, which may be of lower sorptive capacity, to a concentration suitable for application.

The compositions of the invention may be formulated as wettable powders comprising a major proportion of the benzaldoxime mixed with a dispersing, i.e. deflocculating or suspending, agent and, if desired, a finely divided solid carrier. The benzaldoxime may be in particulate form or adsorbed on the carrier and preferably constitutes at least 10%, more preferably at least 50% by weight of the composition. The concentration of the dispersing agent should in general be between 0.1 and 10% by weight of the total composition though larger or smaller amounts may be used if desired.

The dispersing agent used in the composition of the invention may be any substance having definite dispersing, i.e. deflocculating or suspending, properties as distinct from wetting properties, although these substances may also possess wetting properties.

The dispersing agent used may be a protective colloid such as gelatin, glue, casein, gums or a synthetic polymeric material such as polyvinyl alcohol. Preferably, however, the dispersing agents used are sodium or calcium salts of high molecular weight sulphonic acids, e.g. the sodium or calcium salts of lignin sulphonic acids derived from sulphite cellulose waste liquors. The calcium or sodium salts of condensed aryl sulphonic acids, for example the product known as "Tamol 731," are also suitable.

The dispersing agents used may be non-ionic emulsifiers, for example the condensation products of fatty acids containing at least 12, preferably 16 to 20, carbon atoms in the molecule, or of abietic acid or naphthenic acids obtained in the refining of petroleum lubricating oil fractions, with alkylene oxides such as ethylene oxide or propylene oxide or with both ethylene oxide and propylene oxide as, for example, the condensation product of oleic acid and ethylene oxide containing 6 ethylene oxide units in the molecule. Partial esters of the above acids with polyhydric alcohols such as glycerol, polyglycerol, sorbitol or mannitol may also be used.

The dispersing agents referred to above may also possess wetting properties but in general it is preferable to incorporate two separate surface active agents, one having particularly good dispersing properties and the other having particularly good wetting properties. The actual amount of wetting agent incorporated can be varied considerably and in general is from 0 to 10% by weight based on the total composition.

Suitable wetting agents include the alkali metal salts, preferably sodium salts, of sulphuric acid esters or sulphonic acids containing at least 10 carbon atoms in the molecule, for example, the sodium secondary alkyl sulphates available under the registered trademark "Teepol," sodium salts of sulphonated castor oil, sodium dodecyl benzene sulphonate. Non-ionic wetting agents may also be employed for example, polyalkylene oxide polymers, e.g. the "Pluronics," and condensation products of polyalkylene oxides with aromatic nuclei (e.g. octyl cresol).

Granulated or pelleted compositions comprising a suitable carrier having a benzaldoxime incorporated therewith are also included in the invention. These may be prepared by impregnating a granular carrier with a solution of the benzaldoxime or by granulating a mixture of a finely divided solid carrier and the benzaldoxime. The carrier used may consist of or contain a fertilizer or fertilizer mixture, for example superphosphate.

The compositions of the invention may also be formulated as solutions of benzaldoxime in an organic solvent or mixture of solvents, for example of alcohols, ketones especially acetone, ethers, hydrocarbons. Fungicidal compounds of the invention to be used as seed dressings are preferably dissolved in dimethylformamide (DMF)

or in a mixture of dimethylformamide and methanol. A suitable seed dressing formulation comprises for example, 1 to 10% w./v. of alphathiocarbamoyl-4-chlorobenzaldoxime and 99 to 90% of DMF or 1:1 mixture of DMF and methanol. Petroleum hydrocarbon fractions used as solvents should preferably have a flash point above 73° F., for example, a refined aromatic extract of kerosine. For use in application of fungicidal compounds to foliage the solvent used should not be phytotoxic and for this purpose a petroleum spray oil boiling in the range 275° to 575° F. or boiling in the range 575° to 1000° F. and having an unsulphonatable residue of at least 75% and preferably of at least 90%, or a mixture of these two types of oil, is preferably used. Auxiliary solvents such as alcohols, ketones and polyalkylene glycol ethers and esters may be used in conjunction with these petroleum solvents. Such oil solutions are particularly suitable for application by low volume spraying for example at the rate of 5 to 10 gallons per acre. They may also be diluted with a cheap solvent for high volume spraying.

Compositions of the present invention may also be formulated as emulsifiable concentrates which are concentrated solutions or dispersions of the benzaldoxime in an organic liquid, preferably a water-insoluble organic liquid, containing an added emulsifying agent. These concentrates may also contain a proportion of water for example up to 50% by volume, based on the total composition (i.e. a "mayonnaise" composition) to facilitate subsequent dilution with water. Suitable organic liquids are for example the above petroleum hydrocarbon fractions as described above.

The emulsifying agent may be of the type producing water-in-oil type emulsions which are suitable for application by low volume spraying, or an emulsifier of the type producing oil-in-water emulsions may be used, producing concentrates which can be diluted with relatively large volumes of water for application by high volume spraying. In such emulsions, the benzaldoxime is preferably in the non-aqueous phase.

Suitable types of emulsifier for use in these emulsions or emulsifiable concentrates are the non-ionic and anionic dispersing and wetting agents described above, also suitable are long chain alkyl ammonium salts and alkyl sulpho-succinates.

The concentration of emulsifier used will in general be within the limits 0.5% and 25.0% based on the final composition.

The compositions of the invention may contain other ingredients, for example, water conditioning agents for example, sodium polyphosphates or cellulose ethers, other herbicides, pesticides or stockers, for example a non-volatile oil.

Aqueous dispersions and emulsions, for example, compositions obtained by diluting the wettable powders or emulsifiable concentrates of the present invention with water also lie within the scope of the present invention.

We claim as our invention:

Alpha-thiocarbamoyl-2,6-dichlorobenzaldoxime.

References Cited by the Examiner

UNITED STATES PATENTS

| | | | |
|---|---|---|---|
| 2,749,358 | 6/1956 | Reilly | 260—566 X |
| 2,768,195 | 10/1956 | Dodson | 260—465 |
| 2,770,652 | 11/1956 | England | 260—566 |
| 2,786,865 | 3/1957 | Copenhaver | 260—566 |
| 2,926,187 | 2/1960 | Melby | 260—465 |
| 2,943,016 | 6/1960 | Rosen et al. | 167—30 |
| 2,965,535 | 12/1960 | Birum | 167—30 |

FOREIGN PATENTS 835,755  5/1960  Great Britain.

OTHER REFERENCES

Beilstein: "Handbuch der Organischen Chemie," volume 10, pages 660 and 662–664 (1927).

Beilstein: "Handbuch der Organischen Chemie," volume 10, Part II, page 457 (1949).

Conant et al.: "The Chemistry of Organic Compounds," 4th edition, page 335 (1952).

CHARLES B. PARKER, *Primary Examiner.*